(12) United States Patent
Takahashi

(10) Patent No.: US 9,699,344 B2
(45) Date of Patent: Jul. 4, 2017

(54) IMAGE FORMING APPARATUS CAPABLE OF TEST PRINTING, IMAGE FORMING SYSTEM, DESTINATION SORTING APPARATUS, METHOD OF CONTROLLING THE IMAGE FORMING APPARATUS, AND STORAGE MEDIUM

(71) Applicant: CANON KABUSHIKI KAISHA, Tokyo (JP)

(72) Inventor: Toru Takahashi, Matsudo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/078,008

(22) Filed: Mar. 23, 2016

(65) Prior Publication Data

US 2016/0295056 A1  Oct. 6, 2016

(30) Foreign Application Priority Data

Apr. 1, 2015 (JP) ................................. 2015-075123

(51) Int. Cl.
*G06F 15/00* (2006.01)
*G06F 3/12* (2006.01)
*G06K 1/00* (2006.01)
*H04N 1/00* (2006.01)

(52) U.S. Cl.
CPC ..... *H04N 1/00925* (2013.01); *H04N 1/00031* (2013.01); *H04N 1/0032* (2013.01); *H04N 1/00641* (2013.01); *H04N 2201/0094* (2013.01)

(58) Field of Classification Search
CPC .......... H04N 1/00925; H04N 1/00031; H04N 1/0032; H04N 1/00641; H04N 2201/0094
USPC ...................... 358/1.13, 1.1, 1.14, 1.15, 1.18
See application file for complete search history.

(56) References Cited

U.S. PATENT DOCUMENTS

| 2005/0046658 A1* | 3/2005 | Kojima | B41J 2/2139 347/19 |
| 2009/0317122 A1* | 12/2009 | Takahashi | G03G 15/50 399/82 |
| 2014/0198329 A1 | 7/2014 | Guminski et al. | |
| 2014/0270396 A1* | 9/2014 | Miyagawa | H04N 1/00005 382/112 |

* cited by examiner

*Primary Examiner* — Douglas Tran
(74) *Attorney, Agent, or Firm* — Rossi, Kimms & McDowell LLP

(57) ABSTRACT

An image forming apparatus that enables a user to check results of test printing quickly. An MFP as the image forming apparatus is connected to an external finisher as a post-processing apparatus that performs post processing on printed recording media. The MFP and the external finisher are controlled independently of each other. The MFP is comprised of a printer controller configured to execute test printing of a printing object, and a conveyance controller configured to perform control such that when executing the test printing, printed recording media are not conveyed to the external finisher.

14 Claims, 9 Drawing Sheets

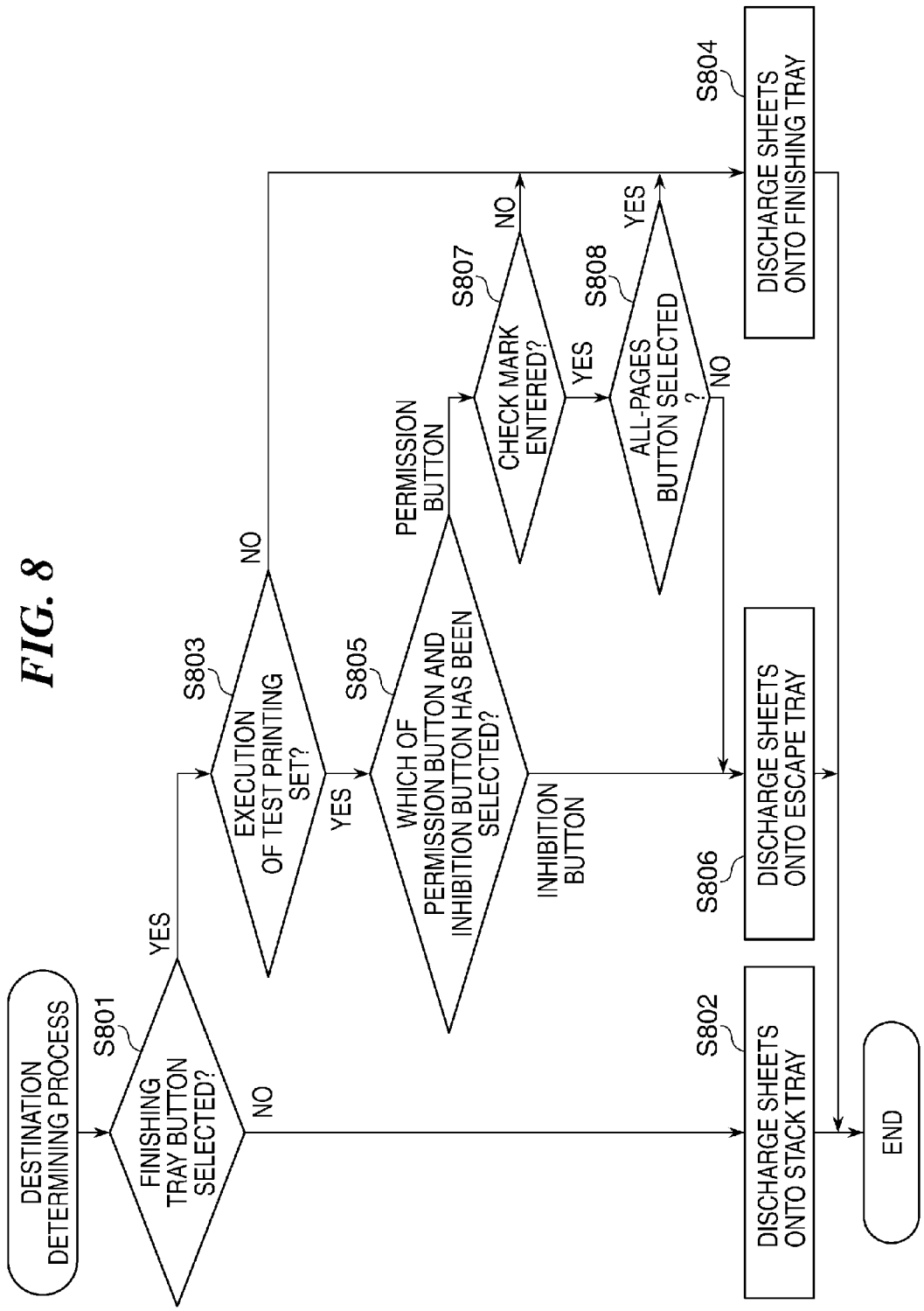

IMAGE FORMING APPARATUS CAPABLE OF TEST PRINTING, IMAGE FORMING SYSTEM, DESTINATION SORTING APPARATUS, METHOD OF CONTROLLING THE IMAGE FORMING APPARATUS, AND STORAGE MEDIUM

BACKGROUND OF THE INVENTION

Field of the Invention

The present invention relates to an image forming apparatus capable of test printing, an image forming system, a destination sorting apparatus, a method of controlling the image forming apparatus, and a storage medium.

Description of the Related Art

Conventionally, there has been known an image forming system in which post-processing optional apparatuses, such as a stacker and a finisher, are connected to an image forming apparatus (see e.g. Publication of US Patent Application No. 2014/0198329). In the image forming system described in Publication of US Patent Application No. 2014/0198329, the image forming apparatus and the post-processing optional apparatuses are controlled independently of each other. In accordance with this, the image forming apparatus transmits to the post-processing optional apparatuses a minimum command indicating e.g. that a recording medium having image data printed thereon will be transferred to the post-processing optional apparatuses, but does not get involved in processing that is executed by the post-processing optional apparatuses.

Incidentally, an image forming apparatus has a test printing function of printing one copy as test printing before printing a plurality of copies of document data or the like. When a user desires to check results of the test printing quickly, the user desires to check a printed outcome of the test printing, before a post-processing optional apparatus performs post processing, e.g. stapling processing, on the printed outcome.

However, when test printing is performed by the image forming system in which the image forming apparatus does not get involved in processing that is performed by a post-processing optional apparatus, a printed outcome of the test printing is conveyed to the post-processing optional apparatus, and therefore the user cannot check results of the test printing until the post-processing optional apparatus performs processing on the printed outcome, so that it is impossible to check the results of the test printing quickly.

SUMMARY OF THE INVENTION

The present invention provides an image forming apparatus that enables a user to check results of test printing quickly, an image forming system, a destination sorting apparatus, a method of controlling the image forming apparatus, and a storage medium.

In a first aspect of the invention, there is provided an image forming apparatus that is connected to a post-processing apparatus for performing post processing on printed recording media, and is controlled independently of the post-processing apparatus, comprising a test printing execution unit configured to execute test printing of a printing object, and a control unit configured to perform control such that when executing the test printing, the printed recording media are not conveyed to the post-processing apparatus.

In a second aspect of the invention, there is provided an image forming system in which an image forming apparatus and a post-processing apparatus that performs post processing on printed recording media are connected to each other, and the image forming apparatus and the post-processing apparatus are controlled independently of each other, comprising a test printing execution unit configured to execute test printing of a printing object, and a control unit configured to perform control such that when executing the test printing, the printed recording media are not conveyed to the post-processing apparatus.

In a third aspect of the invention, there is provided a destination sorting apparatus that is disposed between an image forming apparatus and a post-processing apparatus that performs post processing on printed recording media, and is controlled independently of the image forming apparatus and the post-processing apparatus, comprising a storage unit configured to store the printed recording media conveyed from the image forming apparatus when the printed recording media are a printed outcome of test printing of a printing object, and a conveyance unit configured to convey the printed recording media to the post-processing apparatus when the printed recording media are not a printed outcome of the test printing.

In a fourth aspect of the invention, there is provided a method of controlling an image forming apparatus that is connected to a post-processing apparatus for performing post processing on printed recording media, and is controlled independently of the post-processing apparatus, comprising executing test printing of a printing object, and performing control such that when executing the test printing, the printed recording media are not conveyed to the post-processing apparatus.

In a fifth aspect of the invention, there is provided a non-transitory computer-readable storage medium storing a computer-executable program for causing a computer to execute a method of controlling an image forming apparatus that is connected to a post-processing apparatus for performing post processing on printed recording media, and is controlled independently of the post-processing apparatus, wherein the method comprises executing test printing of a printing object, and performing control such that when executing the test printing, the printed recording media are not conveyed to the post-processing apparatus.

According to the invention, the user can check results of test printing quickly.

Further features of the present invention will become apparent from the following description of exemplary embodiments (with reference to the attached drawings).

BRIEF DESCRIPTION OF THE DRAWINGS

FIG. 8 is a flowchart of a destination determining process for determining a destination of printed recording media discharged from the MFP appearing in FIG. 1.

DESCRIPTION OF THE EMBODIMENTS

The present invention will now be described in detail below with reference to the accompanying drawings showing embodiments thereof.

Figure 1:
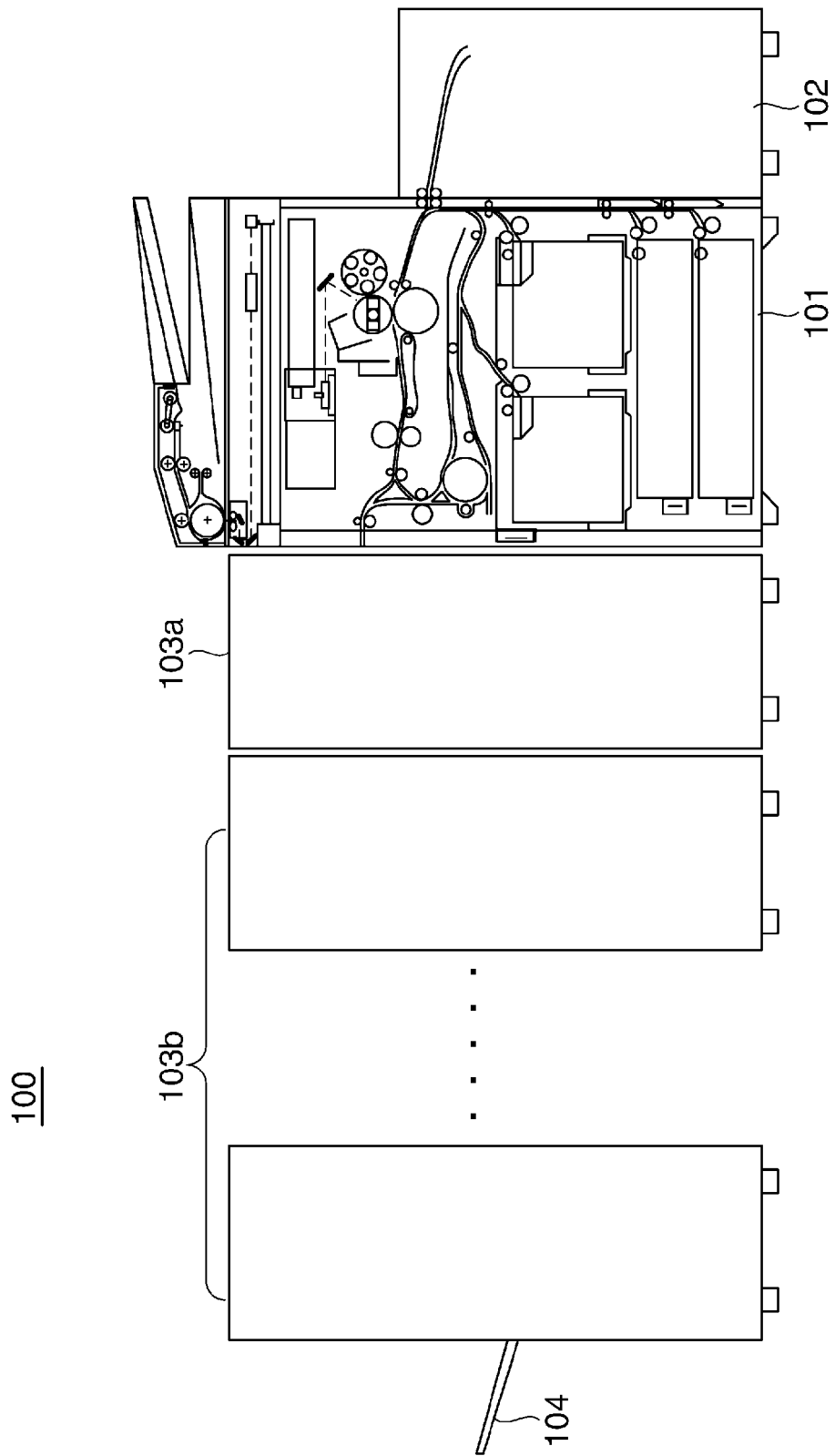
FIG. 1 is a schematic view of an image forming system according to an embodiment of the present invention.

FIG. 1 is a schematic view of an image forming system 100 according to an embodiment of the invention.

The image forming system 100 is comprised of an MFP 101 as an image forming apparatus and a sheet feed optional unit 102, a stacking apparatus 103a (destination sorting apparatus), an external finisher 103b (post-processing apparatus), and a finishing tray 104, as optional apparatuses and devices. The sheet feed optional unit 102 and the external finisher 103b are connected to the MFP 101. The stacking apparatus 103a is disposed between the MFP 101 and the external finisher 103b, and the finishing tray 104 is connected to the external finisher 103b. The MFP 101 is controlled independently of the external finisher 103b.

The sheet feed optional unit 102 feeds recording media to the MFP 101. The MFP 101 prints image data on the recording media fed from the sheet feed optional unit 102. The stacking apparatus 103a sorts the recording media having the image data printed thereon (hereinafter each referred to as "a printed recording medium") in the MFP 101, based on respective destinations. The external finisher 103b includes at least one of a stapling device, a punching device, a saddle stitching device, a bookbinding device, a folding device, and so forth, which each perform receiving processing for receiving printed recording media discharged from the MFP 101, and perform stapling processing, punching processing, saddle stitching processing, bookbinding processing, folding processing, and so forth, as post processing on the printed recording media, respectively. The finishing tray 104 receives printed recording media having been subjected to post processing by the external finisher 103b.

Figure 2:
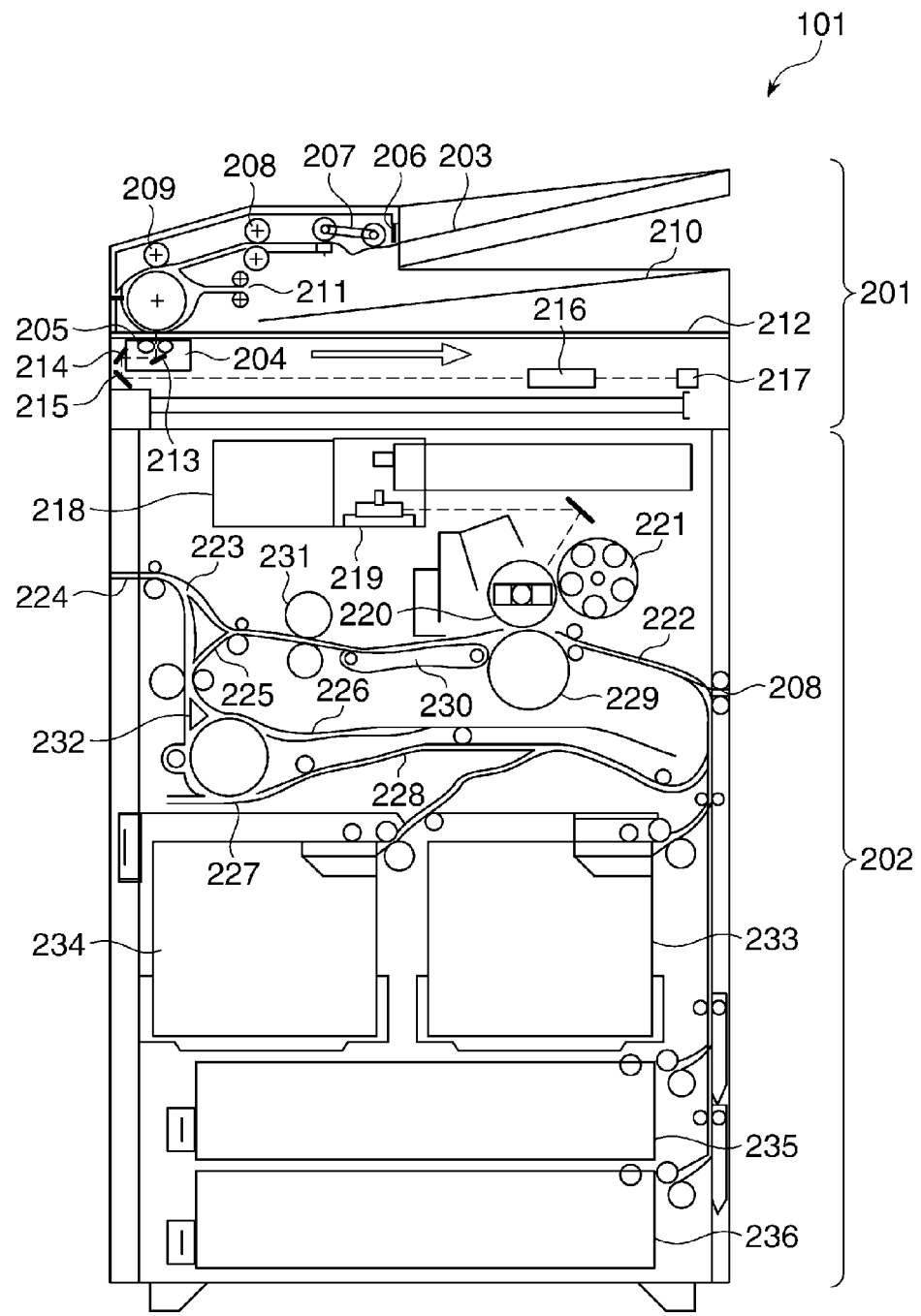
FIG. 2 is a schematic view of the inside of an MFP appearing in FIG. 1.

FIG. 2 is a schematic view of the inside of the MFP 101 appearing in FIG. 1.

The MFP 101 shown in FIG. 2 is comprised of a scanner section 201 that performs reading of originals and a printer section 202 that prints image data on recording media. The scanner section 201 is comprised of a document feed tray 203, an optical unit 204, a lamp 205, a sensor 206, pickup rollers 207, conveying rollers 208 and 209, a document discharge tray 210, inversion rollers 211, a platen glass 212, mirrors 213, 214, and 215, a lens 216, and a CCD (charge coupled device) image sensor 217. The printer section 202 is comprised of a laser driver 218, a laser emitting section 219, a photosensitive drum 220, a developing device 221, paths 222 to 228, a transfer section 229, a conveyance belt 230, a fixing section 231, a flapper 232, and sheet feed cassettes 233 to 236.

When the scanner section reads an original, first, the sensor 206 detects whether or not an original bundle has been set on the document feed tray 203. When an original bundle has been set on the document feed tray 203, the lamp 205 is lit, and originals forming the original bundle are conveyed one by one into the scanner section 201 by the pickup rollers 207. An original conveyed into the scanner section 201 is conveyed to the optical unit 204 fixed at a predetermined location, via the conveying rollers 208 and 209. The optical unit 204 scans the original by irradiating the front side of the same with light, and when it is not required to read the back side of the original, the original is passed through the inversion rollers 211, and is then discharged onto the document discharge tray 210.

When it is required to read the back side of the original after the reading of the front side of the same, the scanner section 201 causes the original to be temporarily held by the inversion rollers 211, and be conveyed in an inverted state to the optical unit 204 via the conveying roller 209. Thereafter, the optical unit 204 scans the conveyed original by irradiating the back side of the same with light, and discharges the original onto the document discharge tray 210.

Note that the scanner section 201 may read an original set on the platen glass 212. The original set on the platen glass 212 is read by the optical unit 204 which is moved at a constant speed in a sub scanning direction (direction indicated by an arrow in FIG. 2).

When the optical unit 204 irradiates, with light, an original conveyed into the scanner section 201 from the document feed tray 203 or set on the platen glass 212, reflected light is generated. The reflected light enters the CCD image sensor 217 via the mirrors 213, 214, and 215 and the lens 216. The CCD image sensor 217 generates image data based on the reflected light having entered therein, and new image data obtained by performing image processing on the generated image data is sent to a controller unit 401, referred to hereinafter.

When image data is printed on a recording medium in the printer section 202, first, the laser driver 218 drives the laser emitting section 219, and the laser emitting section 219 emits a laser beam based on the image data to be printed, to thereby irradiate the photosensitive drum 220 with the emitted laser beam. On the photosensitive drum 220, a latent image is formed based on the irradiated laser beam, and the developing device 221 applies developer to the latent image formed on the photosensitive drum 220. Then, a recording medium contained in one of the sheet feed cassettes 233 to 236 is conveyed to the transfer section 229 via the path 222, and the developer applied to the photosensitive drum 220 is transferred onto the front side of the conveyed recording medium. The recording medium having the developer transferred thereon is conveyed to the fixing section 231 by the conveyance belt 230, and the fixing section 231 performs heat treatment and pressure treatment on the recording medium. This causes the developer to be fixed on the front side of the recording medium. When it is not required to print image data on the back side of the recording medium, the recording medium having the developer fixed thereon is discharged out of the MFP 101 via the paths 223 and 224.

When it is required to print image data on the back side of the recording medium having the developer fixed thereon, the recording medium having passed through the fixing section 231 is conveyed into the paths 225 and 226 and is switched back in the path 226, whereafter it is conveyed into the path 222 via the flapper 232 and the paths 227 and 228. Thereafter, image data is printed on the back side of the recording medium conveyed into the path 222, in the same manner as in the case of image printing on the front side of the recording medium.

Figure 3:
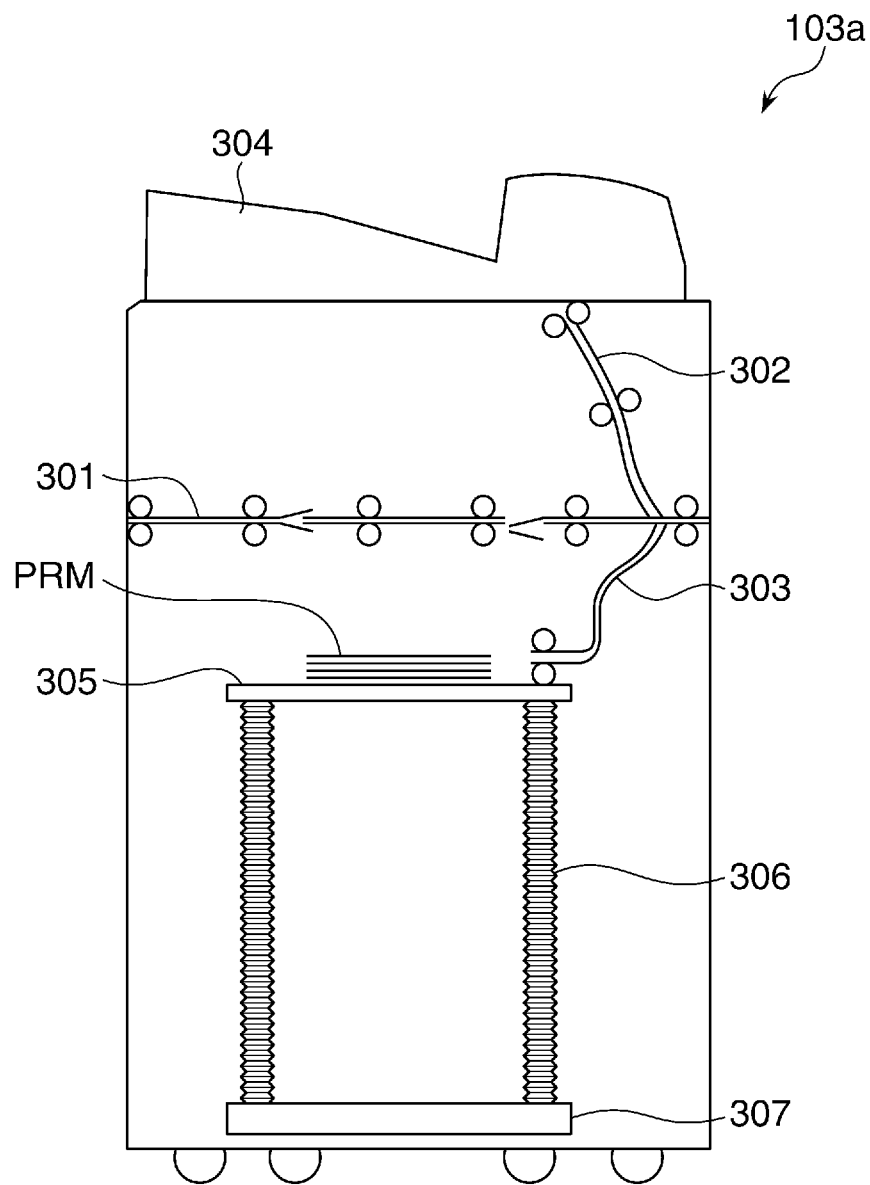
FIG. 3 is a schematic view of the inside of a stacking apparatus to be connected to the MFP.

FIG. 3 is a schematic view of the inside of the stacking apparatus 103a that is connected to the MFP 101 appearing in FIG. 1.

The stacking apparatus 103a shown in FIG. 3 includes a straight path 301, an escape path 302, and a stack path 303. Further, the stacking apparatus 103a includes an escape tray 304, a stack tray 305, and a carriage 307 supporting the stack tray 305 via stays 306 capable of extension and contraction. Printed recording media conveyed from the MFP 101 are conveyed through the straight path 301, the escape path 302, or the stack path 303 to the finishing tray 104, the escape tray 304, or the stack tray 305, which is selected as a destination via a sheet discharge destination-selecting screen 620, referred to hereinafter. The printed recording media conveyed onto the stack tray 305 are indicated by PRM in FIG. 3.

For example, when the finishing tray 104 is selected via the sheet discharge destination-selecting screen 620, the printed recording media are conveyed to the finishing tray 104 via the straight path 301 and the external finisher 103b. When the escape tray 304 is selected via the sheet discharge destination-selecting screen 620, the printed recording media are conveyed to the escape tray 304 via the escape path 302, and when the stack tray 305 is selected via the sheet discharge destination-selecting screen 620, the printed recording media are conveyed to the stack tray 305 via the stack path 303. Note that in the present embodiment, it is assumed that recording media to be conveyed to the finishing tray 104 is subjected to post processing in the external finisher 103b.

Figure 4:
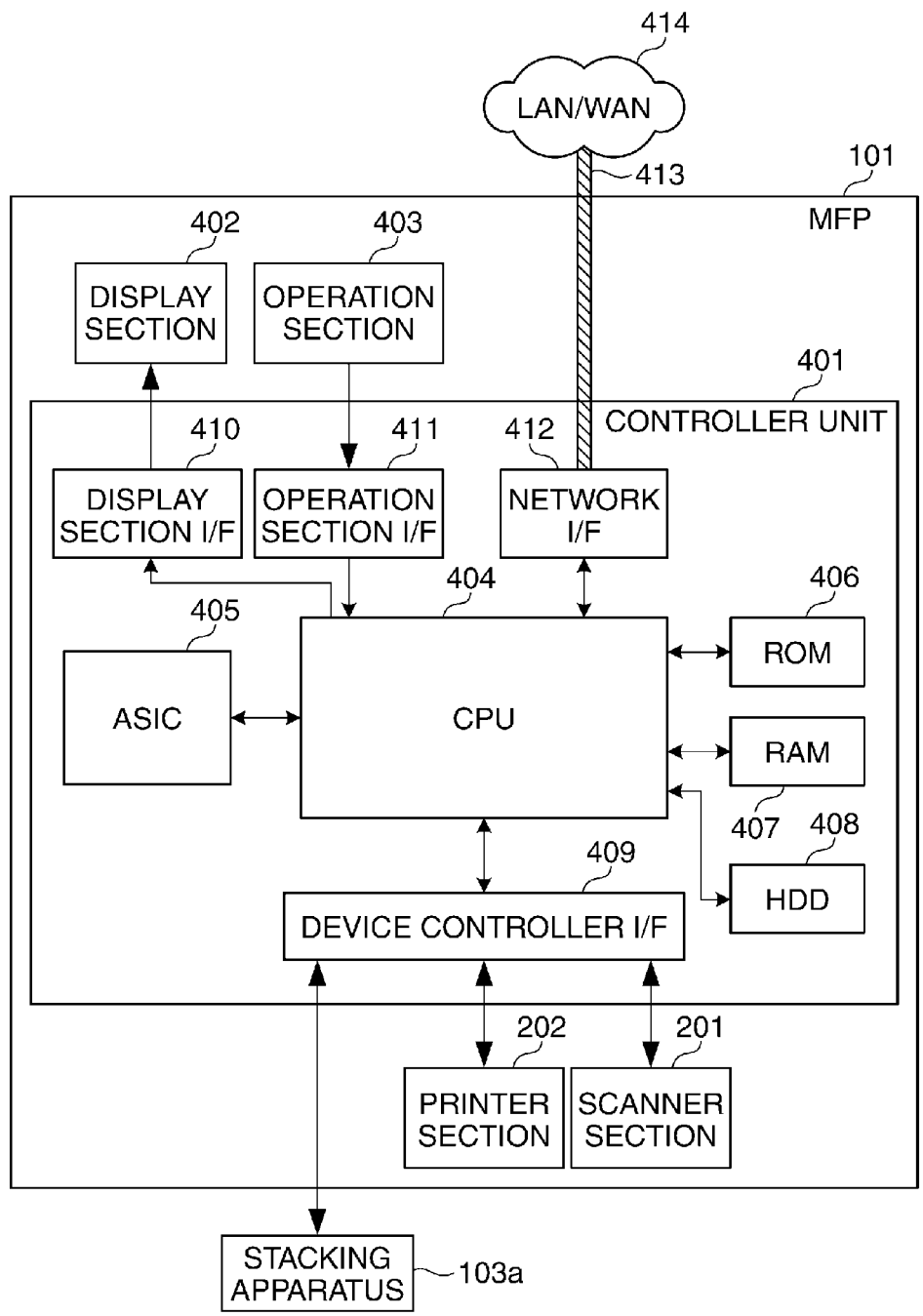
FIG. 4 is a schematic block diagram of the MFP shown in FIG. 2.

FIG. 4 is a block diagram of the MFP 101 shown in FIG. 2.

The MFP 101 shown in FIG. 4 includes not only the scanner section 201 and the printer section 202, but also the controller unit 401, a display section 402, and an operation section 403. The controller unit 401 is comprised of a CPU 404, an ASIC 405, a ROM 406, a RAM 407, an HDD 408, a device controller interface 409, a display section interface 410, an operation section interface 411, and a network interface 412.

The ASIC 405, the ROM 406, the RAM 407, the HDD 408, the device controller interface 409, the display section interface 410, the operation section interface 411, and the network interface 412 are interconnected via the CPU 404. The device controller interface 409 connects the stacking apparatus 103a, the scanner section 201, and the printer section 202, to the CPU 404. The display section interface 410 connects between the display section 402 and the CPU 404. The operation section interface 411 connects between the operation section 403 and the CPU 404, and the network interface 412 connects between a LAN/WAN 414 and the controller unit 401 via a network cable 413. External apparatuses including PCs (not shown) are connected to the LAN/WAN 414.

The display section 402, which is implemented by an LED (Light Emitting Diode) display and a liquid crystal display, displays screens for receiving instructions to be given to the MFP 101, and status information of the MFP 101. The operation section 403 receives operation instructions from a user. The CPU 404 controls the components of the MFP 101. The ASIC 405 controls components of the MFP 101 which perform specific processing, such as image processing. The ROM 406, which is a nonvolatile memory, stores various control programs. The RAM 407, which is a volatile memory, serves as the working memory of the CPU 404. When a program stored in the ROM 406 is to be executed, the program is loaded into the RAM 407. The HDD 408, which includes a storage medium, such as a magnetic disk, stores print jobs, image data for printing, and so forth.

Figure 5:
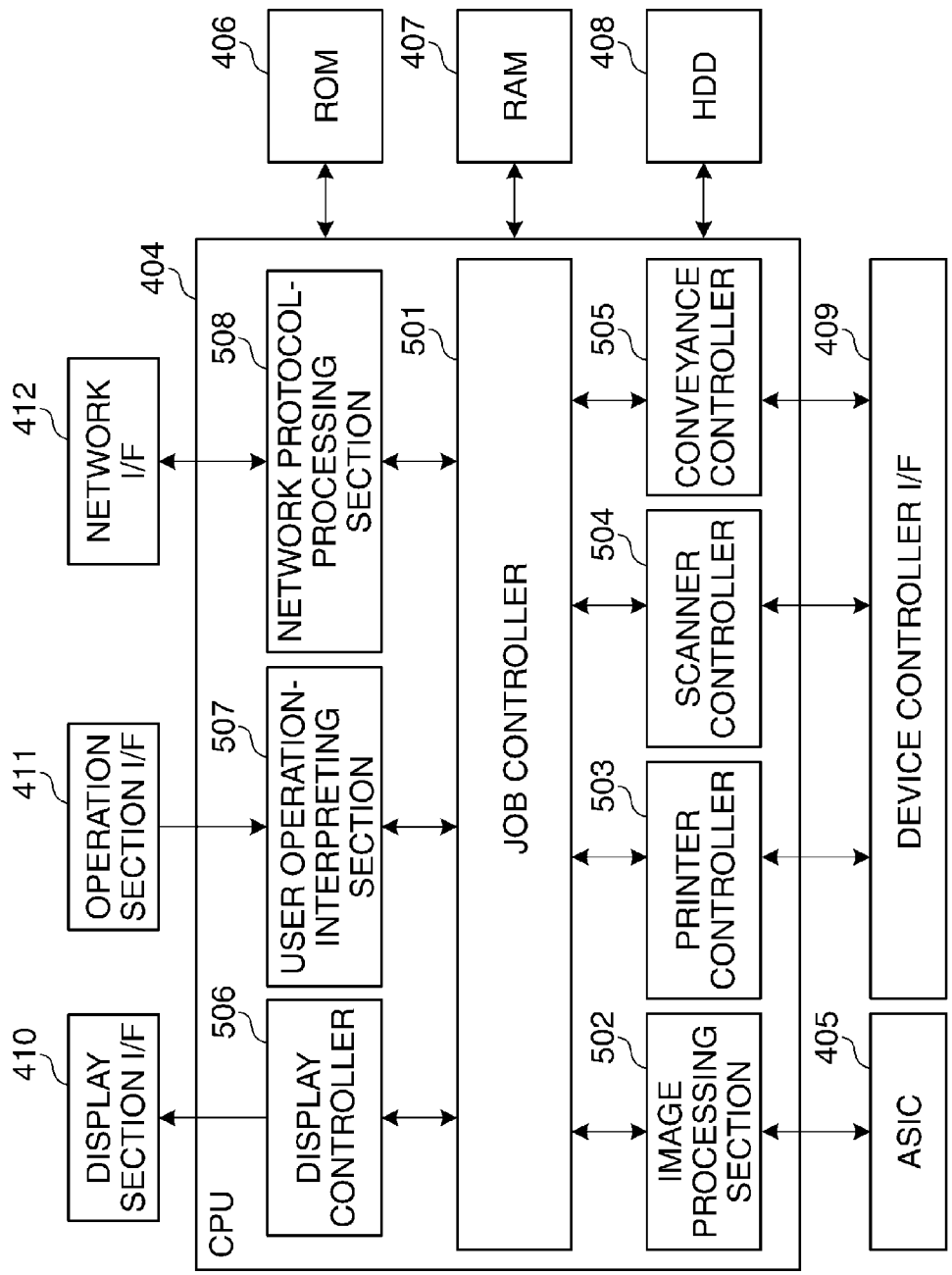
FIG. 5 is a schematic block diagram of a CPU appearing in FIG. 4.

FIG. 5 is a schematic block diagram of the CPU 404 appearing in FIG. 4.

The CPU 404 shown in FIG. 5 is comprised of a job controller 501, an image processing section 502, a printer controller 503, a scanner controller 504, a conveyance controller 505 (control unit), a display controller 506, a user operation-interpreting section 507, and a network protocol-processing section 508. These components are interconnected via the job controller 501.

The job controller 501 controls the components of the MFP 101 so as to execute various jobs received from the operation section 403 or external apparatuses each connected to the LAN/WAN 414. The image processing section 502 is controlled by the ASIC 405 to perform image processing, such as expansion, compression, or rotation, on image data of an original read by the scanner section 201 or image data corresponding to PDL (Page Description Language) data received from an external apparatus connected to the LAN/WAN 414. The printer controller 503 (test printing execution unit) controls the printer section 202 to execute test printing, for example. The scanner controller 504 controls the scanner section 201. The conveyance controller 505 controls conveyance of a printed recording medium to one of the finishing tray 104, the escape tray 304, and the stack tray 305. When the printed recording medium is to be conveyed to the finishing tray 104, the conveyance controller 505 notifies the stacking apparatus 103a of the conveyance.

The display controller 506 controls the display section 402. The user operation-interpreting section 507 instructs the job controller 501 e.g. to suspend a job under execution or resume a job under suspension according to an operation instruction received via the operation section 403. The network protocol-processing section 508 exchanges various kinds of data with the external apparatuses connected to the LAN/WAN 414, based on standard network protocols including e.g. the TCP/IP (Transmission Control Protocol/Internet Protocol).

Figure 6A:
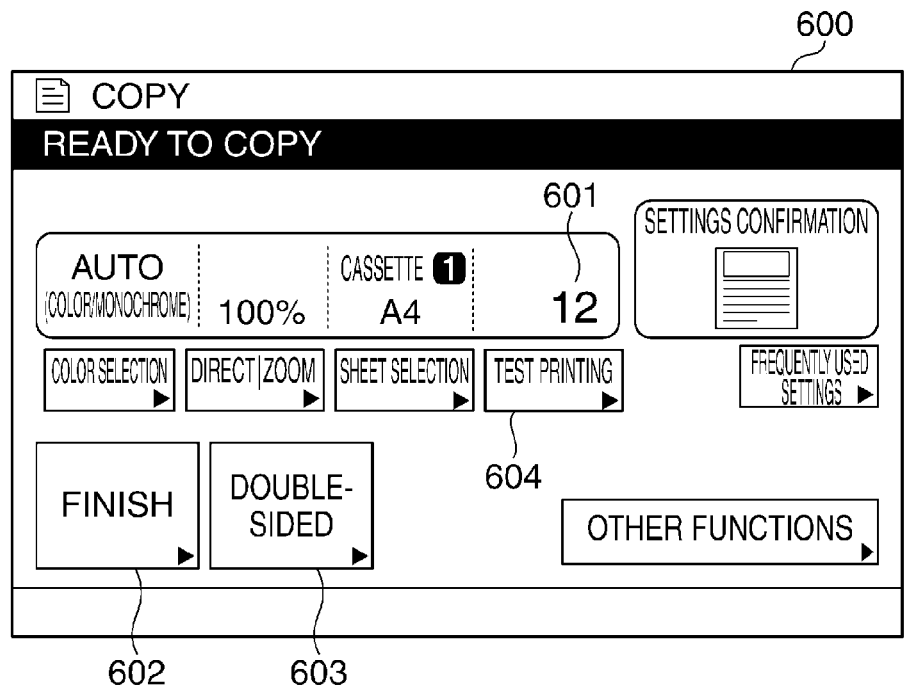
FIG. 6A is a view useful in explaining a printing condition-setting screen that is displayed on a display section appearing in FIG. 4.

FIG. 6A is a view useful in explaining a printing condition-setting screen 600 that is displayed on the display section 402 appearing in FIG. 4. The printing condition-setting screen 600 is displayed on the display section 402 e.g. when an original is to be copied.

The printing condition-setting screen 600 includes a copy count display field 601. The copy count display field 601 displays the number of copies when an original is to be copied. Further, the printing condition-setting screen 600 includes a finishing setting button 602, a double-sided printing-setting button 603, and a test printing-setting button 604.

Figure 6B:
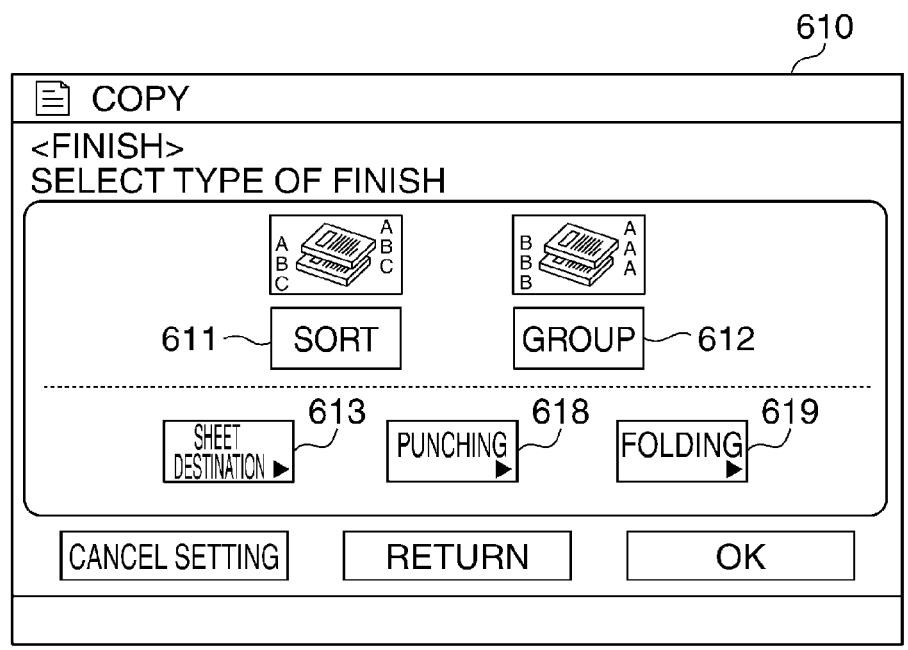
FIG. 6B is a view useful in explaining a finishing setting screen that is displayed on the display section when a finishing setting button appearing in FIG. 6A is pressed.

When the finishing setting button 602 is pressed, a finishing setting screen 610 (see FIG. 6B) is displayed on the display section 402. The finishing setting screen 610 includes a sort printing button 611, a group printing button 612, a sheet discharge destination-selecting button 613, a punching setting button 618, and a folding setting button 619. Only one button can be selected between the sort printing button 611 and the group printing button 612. When the sort printing button 611 is selected, sort printing in which print data is printed for a plurality of copies, in units of copies, is executed, whereas when the group printing button 612 is selected, group printing in which print data is printed for a plurality of copies, in units of pages, is executed.

When the sheet discharge destination-selecting button 613 is pressed, the sheet discharge destination-selecting screen 620 (see FIG. 6C) for use in selecting a discharge destination of printed recording media is displayed on the display section 402. The sheet discharge destination-selecting screen 620 includes a finishing tray button 621, a stack tray button 622, and an escape tray button 623, and only one of the buttons can be selected. When the finishing tray button 621 is selected, printed recording media are discharged onto the finishing tray 104. When the stack tray button 622 is selected, printed recording media are discharged onto the stack tray 305, and when the escape tray button 623 is selected, printed recording media are discharged onto the escape tray 304.

Referring again to FIG. 6B, when the punching setting button 618 is pressed, conditions for performing punching processing on printed recording media in the external finisher 103*b* are set. For example, conditions concerning the positions and numbers of punched holes are set. When the folding setting button 619 is pressed, conditions for performing folding processing on printed recording media in the external finisher 103*b* are set. For example, conditions concerning a folding style, such as Z folding or inward three-folding, and positions of folds are set.

Referring again to FIG. 6A, when the double-sided printing-setting button 603 is pressed, whether image data printing is to be performed only on the front side of a recording medium or on both the front and back sides of the same is set. When the test printing-setting button 604 is pressed, a test printing condition-setting screen 630 (see FIG. 6D) for use in setting test printing conditions is displayed on the display section 402. The test printing condition-setting screen 630 includes an all-pages button 631 and a designated-pages button 632. When either the all-pages button 631 or the designated-pages button 632 is selected, test printing is executed. When the all-pages button 631 is selected, all pages constituting a printing object (i.e. the whole of the printing object) are printed, while when the designated-pages button 632 is selected, one or more of the pages constituting the printing object, which have been designated by a user, (i.e. part of the printing object) are printed.

Figure 6C:
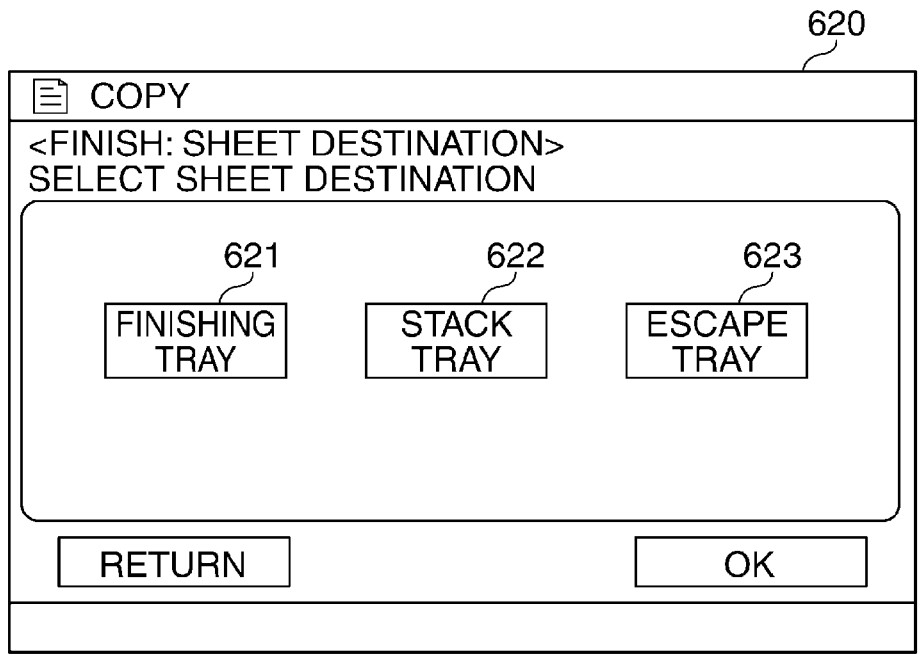
FIG. 6C is a view useful in explaining a sheet discharge destination-selecting screen that is displayed on the display section when a sheet discharge destination-selecting button appearing in FIG. 6B is pressed.
Figure 6D:
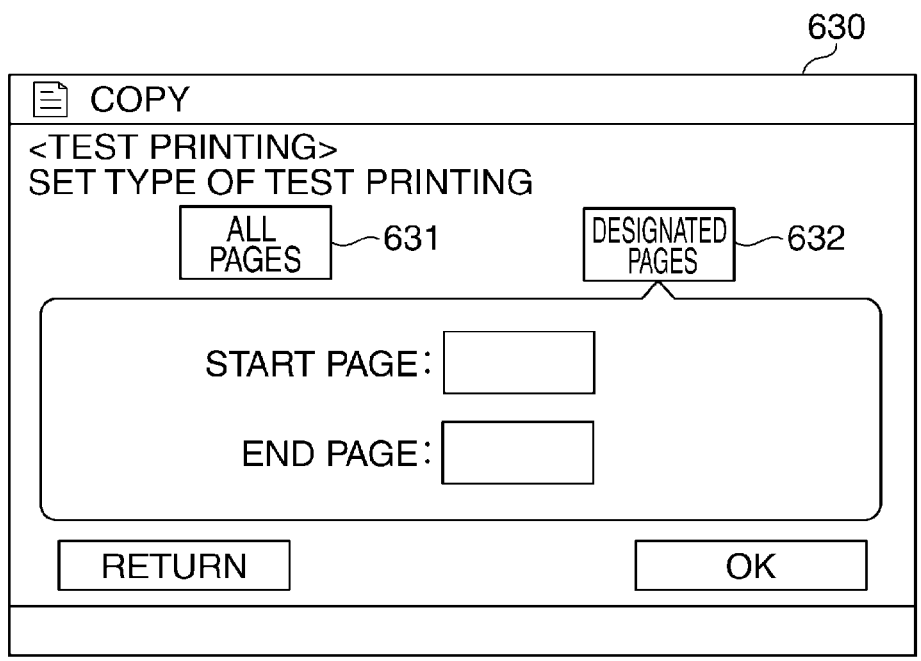
FIG. 6D is a view useful in explaining a test printing condition-setting screen that is displayed on the display section when a test printing-setting button appearing in FIG. 6A is pressed.
Figure 7:
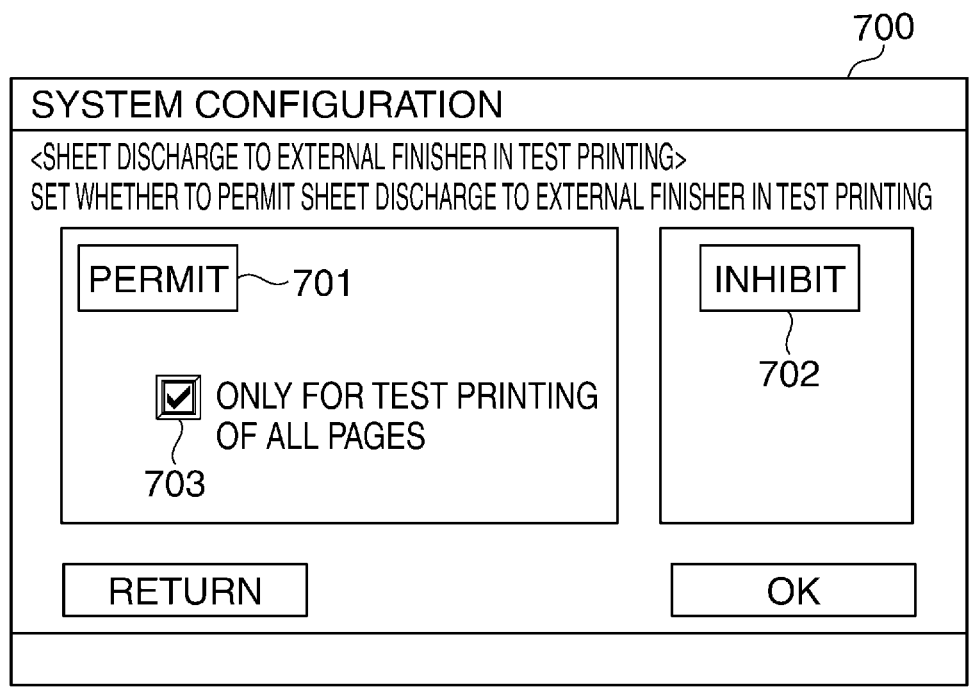
FIG. 7 is a view useful in explaining a permission setting screen that is displayed on the display section appearing in FIG. 4.

FIG. 7 is a view useful in explaining a permission setting screen 700 that is displayed on the display section 402 appearing in FIG. 4. The permission setting screen 700 is displayed on the display section 402 when the finishing tray button 621 appearing in FIG. 6C is selected and also when test printing is to be executed.

The permission setting screen 700 includes a permission button 701 and an inhibition button 702, and one of the buttons is selected. When the permission button 701 is selected, entry of a check mark in a check box 703 is enabled.

When the permission button 701 is selected without entry of the check mark in the check box 703, a printed outcome of test printing is discharged onto the finishing tray 104 connected to the external finisher 103*b*. In a case where the permission button 701 is selected with entry of the check mark in the check box 703, a printed outcome of test printing is discharged onto the finishing tray 104, only when all pages constituting a printing object of the test printing are to be printed, specifically, when the all-pages button 631 has been selected on the test printing condition-setting screen 630, whereas when not all pages constituting a printed target of test printing are to be printed, specifically, when the designated-pages button 632 has been selected on the test printing condition-setting screen 630, a printed outcome of the test printing is not discharged onto the finishing tray 104.

On the other hand, when the inhibition button 702 has been selected, a printed outcome of any test printing is not discharged onto the finishing tray 104. Note that, as described above, in the present embodiment, a printed outcome of the test printing is discharged onto the escape tray 304, in a case where the printed outcome of test printing is not discharged onto the finishing tray 104 in spite of selection of the permission button 701, or in a case where the inhibition button 702 has been selected.

FIG. 8 is a flowchart of a destination determining process for determining a destination of printed recording media discharged from the MFP 101 appearing in FIG. 1. The destination determining process in FIG. 8 is performed by the CPU 404 executing an associated program therefor stored in the ROM 406 or the HDD 408.

Referring to FIG. 8, first, it is determined whether or not the finishing tray button 621 has been selected on the sheet discharge destination-selecting screen 620 (step S801). If it is determined in the step S801 that the finishing tray button 621 has not been selected, printed recording media are discharged onto a discharge tray other than the finishing tray 104, e.g. onto the stack tray 305 (step S802), followed by terminating the present process. On the other hand, if the finishing tray button 621 has been selected, it is determined whether or not execution of test printing has been set by selecting one of the all-pages button 631 and the designated-pages button 632 on the test printing condition-setting screen 630 (step S803).

If it is determined in the step S803 that execution of test printing has not been set, the printed recording media are discharged onto the finishing tray 104 (step S804), followed by terminating the present process, whereas if execution of test printing has been set, it is determined which of the permission button 701 and the inhibition button 702 has been selected on the permission setting screen 700 (step S805). If it is determined in the step S805 that the inhibition button 702 has been selected on the permission setting screen 700, the printed recording media are discharged onto the escape tray 304 (step S806), followed by terminating the present process. On the other hand, if the permission button 701 has been selected on the permission setting screen 700, it is determined whether or not the check mark has been entered in the check box 703 on the permission setting screen 700 (step S807).

If it is determined in the step S807 that the check mark has not been entered in the check box 703 on the permission setting screen 700, the process proceeds to the step S804. On the other hand, if the check mark has been entered in the check box 703 on the permission setting screen 700, it is determined whether or not the all-pages button 631 has been selected on the test printing condition-setting screen 630 (step S808). If it is determined in the step S808 that the all-pages button 631 has been selected, the process proceeds to the step S804, whereas if not the all-pages button 631 but the designated-pages button 632 has been selected, the process proceeds to the step S806.

According to the destination determining process shown in FIG. 8, when test printing is to be executed (YES to the step S803) and also when the inhibition button 702 has been selected on the permission setting screen 700 (NO to the step S805), printed recording media are discharged onto the escape tray 304 (step S806), so that when the printed recording media are a printed outcome of the test printing, the user can check the printed recording media before the external finisher 103*b* performs post processing on the printed recording media. This enables the user to quickly check results of the test printing.

Further, when execution of test printing has been set and also when not the all-pages button 631 but the designated-pages button 632 has been selected (NO to the step S808), printed recording media are discharged onto the escape tray 304 (step S806), whereas in a case where execution of test printing has been set, when the check mark has not been entered in the check box 703 for permitting sheet discharge to the finishing tray 104 when performing test printing of all pages (NO to the step S807) or when the check mark has been entered in the check box 703 (YES to the step S807) and also the all-pages button 631 has been selected (YES to the step S808), printed recording media are discharged onto the finishing tray 104 (step S804). This makes it possible, in a case where the user does not desire to perform printing of all pages constituting a printing object for test printing, i.e. in a case where the user desires to check results of the test printing quickly, the user can quickly check the results of the test printing. On the other hand, in a case where the user desires to perform printing of all pages constituting the printing object for test printing, although it takes time to acquire a printed outcome of a large number of pages of printed recording media, post processing, such as stapling processing, is performed on the printed recording media, and hence it is possible to facilitate handling of the printed recording media.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-075123 filed Apr. 1, 2015 which is hereby incorporated by reference herein in its entirety.

What is claimed is:

1. An image forming apparatus that is connected to a post-processing apparatus for performing post processing on printed recording media, and is controlled independently of the post-processing apparatus, comprising:
   a test printing execution unit configured to execute test printing of a printing object having a plurality of pages; and
   a controller configured to control, when executing the test printing, not to convey the printed recording media to the post-processing apparatus in a case where the post processing is designated to be performed on the printed recording media by the post-processing apparatus and less than all of the plurality of pages are to be printed in the test printing, and to convey the printed recording media to the post-processing apparatus in a case where the post processing is designated to be performed on the printed recording media by the post-processing apparatus and all of the plurality of pages are to be printed in the test printing.

2. The image forming apparatus according to claim 1, further comprising a destination sorting apparatus disposed between the image forming apparatus and the post-processing apparatus, and
   wherein when the controller controls not to convey the printed recording media to the post-processing apparatus, the controller controls to convey the printed recording media to the destination sorting apparatus.

3. The image forming apparatus according to claim 1, further comprising an escape tray,
   wherein the controller controls to convey the printed recording media subjected to the test printing to the escape tray in the case where the post processing is designated to be performed on the printed recording media by the post-processing apparatus and less than all of the plurality of pages are to be printed in the test printing.

4. An image forming system in which an image forming apparatus and a post-processing apparatus that performs post processing on printed recording media are connected to each other, and the image forming apparatus and the post-processing apparatus are controlled independently of each other, comprising:
   a test printing execution unit configured to execute test printing of a printing object having a plurality of pages; and
   a controller configured to control, when executing the test printing, not to convey the printed recording media to the post-processing apparatus in a case where the post processing is designated to be performed on the printed recording media by the post-processing apparatus and less than all of the plurality of pages are to be printed in the test printing, and to convey the printed recording media to the post-processing apparatus in a case where the post processing is designated to be performed on the printed recording media by the post-processing apparatus and all of the plurality of pages are to be printed in the test printing.

5. A method of controlling an image forming apparatus that is connected to a post-processing apparatus for performing post processing on printed recording media, and is controlled independently of the post-processing apparatus, comprising:
   executing test printing of a printing object having a plurality of pages; and
   controlling, when executing the test printing, not to convey the printed recording media to the post-processing apparatus in a case where the post processing is designated to be performed on the printed recording media by the post-processing apparatus and less than all of the plurality of pages are to be printed in the test printing, and to convey the printed recording media to the post-processing apparatus in a case where the post processing is designated to be performed on the printed recording media by the post-processing apparatus and all of the plurality of pages are to be printed in the test printing.

6. A non-transitory computer-readable storage medium storing a computer-executable program for causing a computer to execute a method of controlling an image forming apparatus that is connected to a post-processing apparatus for performing post processing on printed recording media, and is controlled independently of the post-processing apparatus, wherein the method comprises:

executing test printing of a printing object having a plurality of pages; and controlling, when executing the test printing, not to convey the printed recording media to the post-processing apparatus in a case where the post processing is designated to be performed on the printed recording media by the post-processing apparatus and less than all of the plurality of pages are to be printed in the test printing, and to convey the printed recording media to the post-processing apparatus in a case where the post processing is designated to be performed on the printed recording media by the post-processing apparatus and all of the plurality of pages are to be printed in the test printing.

7. An image forming apparatus that is connected to a post-processing apparatus for performing post processing on printed recording media, and is controlled independently of the post-processing apparatus, comprising:

a first receiver configured to receive a print job which is for executing a printing of a print object having a plurality of pages and includes a designation to perform the post processing on the printed recording media by the post-processing apparatus;

a second receiver configured to receive an instruction to execute a test printing for checking images to be printed based on the print job; and a controller configured to control, in a case where less than all of the plurality of pages are to be printed in the test printing based on the print job, not to convey the printed recording media to the post-processing apparatus in the case where the test printing is executed and to convey the printed recording media to the post-processing apparatus in a case where the printing based on the print job, instead of the test printing, is executed.

8. The image forming apparatus according to claim 7, further comprising an escape tray, wherein the controller controls to convey the printed recording media subjected to the test printing to the escape tray in the case where less than all of the plurality of pages are to be printed in the test printing based on the print job.

9. The image forming apparatus according to claim 7, wherein the controller controls to convey the printed recording media subjected to the test printing to the post-processing apparatus in a case where all of the plurality of pages are to be printed in the test printing based on the print job.

10. The image forming apparatus according to claim 7, further comprising a third receiver configured to receive information for setting whether or not the printed recording media subjected to the test printing is to be conveyed to the post-processing apparatus, regardless of the number of pages to be printed in the test printing.

11. The image forming apparatus according to claim 7, wherein the post-processing apparatus performs, in response to reception of the printed recording media, the post processing on the printed recording media.

12. An image forming system in which an image forming apparatus and a post-processing apparatus that performs post processing on printed recording media are connected to each other, and the image forming apparatus and the post-processing apparatus are controlled independently of each other, comprising:

a first receiver configured to receive a print job which is for executing a printing of a print object having a plurality of pages and includes a designation to perform the post processing on the printed recording media by the post-processing apparatus;

a second receiver configured to receive an instruction to execute a test printing for checking images to be printed based on the print job; and a controller configured to control, in a case where less than all of the plurality of pages are to be printed in the test printing based on the print job, not to convey the printed recording media to the post-processing apparatus in the case where the test printing is executed and to convey the printed recording media to the post-processing apparatus in a case where the printing based on the print job, instead of the test printing, is executed.

13. A method of controlling an image forming apparatus that is connected to a post-processing apparatus for performing post processing on printed recording media, and is controlled independently of the post-processing apparatus, comprising:

receiving a print job which is for executing a printing of a print object having a plurality of pages and includes a designation to perform the post processing on the printed recording media by the post-processing apparatus;

receiving an instruction to execute a test printing for checking images to be printed based on the print job; and controlling, in a case where less than all of the plurality of pages are to be printed in the test printing based on the print job, not to convey the printed recording media to the post-processing apparatus in the case where the test printing is executed and to convey the printed recording media to the post-processing apparatus in a case where the printing based on the print job, instead of the test printing, is executed.

14. A non-transitory computer-readable storage medium storing a computer-executable program for causing a computer to execute a method of controlling an image forming apparatus that is connected to a post-processing apparatus for performing post processing on printed recording media, and is controlled independently of the post-processing apparatus, wherein the method comprises:

receiving a print job which is for executing a printing of a print object having a plurality of pages and includes a designation to perform the post processing on the printed recording media by the post-processing apparatus;

receiving an instruction to execute a test printing for checking images to be printed based on the print job; and controlling, in a case where less than all of the plurality of pages are to be printed in the test printing based on the print job, not to convey the printed recording media to the post-processing apparatus in the case where the test printing is executed and to convey the printed recording media to the post-processing apparatus in a case where the printing based on the print job, instead of the test printing, is executed.

\* \* \* \* \*